(12) United States Patent
Dayt

(10) Patent No.: US 7,200,895 B2
(45) Date of Patent: Apr. 10, 2007

(54) CASTOR FOR FURNITURE OR THE LIKE

(75) Inventor: Patrick Dayt, Besancon (FR)

(73) Assignee: Bruandet S.A., La Barre (FR)

( * ) Notice: Subject to any disclaimer, the term of this patent is extended or adjusted under 35 U.S.C. 154(b) by 159 days.

(21) Appl. No.: 10/993,361

(22) Filed: Nov. 22, 2004

(65) Prior Publication Data
US 2005/0108851 A1    May 26, 2005

(30) Foreign Application Priority Data
Nov. 21, 2003   (FR) .................................. 03 13623

(51) Int. Cl.
*A47B 91/00* (2006.01)
(52) U.S. Cl. .......................................... 16/47; 16/35 R
(58) Field of Classification Search ..................... 16/47, 16/48, 35 R, 35 D, 31 R, 44; 188/1.12, 29, 188/69, 31; 280/64, 65, 47.38, 47.39, 47.41
See application file for complete search history.

(56) References Cited

U.S. PATENT DOCUMENTS

| | | | | |
|---|---|---|---|---|
| 3,914,821 A | * | 10/1975 | Screen | 16/35 R |
| 4,212,092 A | * | 7/1980 | Ferrari | 16/35 R |
| 4,219,904 A | * | 9/1980 | Melara | 16/47 |
| 4,290,166 A | * | 9/1981 | Melara | 16/47 |
| 4,455,707 A | * | 6/1984 | Screen | 16/35 R |
| 4,550,808 A | * | 11/1985 | Folson | 188/1.12 |
| 4,649,595 A | * | 3/1987 | Shane | 16/18 CG |
| 4,821,369 A | | 4/1989 | Daniels | |
| 5,355,550 A | * | 10/1994 | Yang | 16/44 |
| 5,368,133 A | * | 11/1994 | Yang | 188/1.12 |
| 5,617,934 A | * | 4/1997 | Yang | 188/1.12 |
| 6,092,262 A | | 7/2000 | Lin | |
| 6,615,448 B2 | | 9/2003 | Melara | |

FOREIGN PATENT DOCUMENTS

| | | | | |
|---|---|---|---|---|
| DE | 2746891 A | * | 4/1979 | |
| EP | 0 645 262 | | 3/1995 | |
| EP | 1 110 757 | | 6/2001 | |
| GB | 2098059 A | * | 11/1982 | |
| JP | 03266702 A | * | 11/1991 | |
| JP | 08067107 A | * | 3/1996 | |
| JP | 10138703 A | * | 5/1998 | |
| JP | 2005178654 A | * | 7/2005 | |

* cited by examiner

*Primary Examiner*—Chuck Y. Mah
(74) *Attorney, Agent, or Firm*—Young & Thompson

(57) ABSTRACT

A castor includes a body, a wall of a rotary bearing, a wheel including an orifice, a rotary shaft, elements for mounting the shaft to co-operate with the bearing wall, the latter having a first bearing wall portion of tuning-fork-shape defining a slot between two limbs and another bearing wall portion having a base and a tenon secured to the base, the tenon may be engaged in the slot. The elements include two oblong holes formed in the limbs and a third oblong hole formed in the tenon. The holes are arranged in the limbs, and in the tenon in such a manner that all three of them are centered on a first axis when the tenon is engaged in the slot. The shaft passes through the bearing wall so that its axis is substantially parallel to the first axis and can be engaged in the orifice in the wheel.

11 Claims, 3 Drawing Sheets

CASTOR FOR FURNITURE OR THE LIKE

The present invention relates to castors for furniture to the like, and finds a particularly advantageous application for seats such as office armchairs, for example.

BACKGROUND OF THE INVENTION

It is known that numerous pieces of furniture are mounted on castors so as to make them easy to move. Nevertheless, with a seat, and in particular an armchair, it is often required that the seat can be moved easily while a person is sitting on it, but that in contrast it should be more difficult to move when unoccupied.

To do this, castors for mounting on seats can be provided with a brake system which is not engaged so long as a person sitting on the chair, and which is engaged when the chair is empty.

Such castors have already been made, such as those described in EP-A-0 645 262 and EP-A-1 110 757. In general, a castor of that type comprises a body; means for connecting said body to furniture, e.g. a pivot; a rotary bearing wall defined substantially in a first plane; means for securing the bearing wall to the body; at least one wheel, and advantageously two wheels, each including a respective first orifice defined on a first axis; a rotary shaft of section complementary to the orifice, and defining a second axis; and means for mounting said rotary shaft in co-operation with said first bearing wall, the rotary shaft also being suitable for being engaged in said orifice in such a manner that the first and second axes coincide to enable the wheel to pivot about the second axis.

The castors for furniture or the like that are presently known on the market, such as those described and shown in the two above-referenced documents, give satisfaction in terms of operation, but they present the following drawback: the complexity of their structure involves a relatively large number of component parts being provided, with said parts being awkward to assemble together.

OBJECTS AND SUMMARY OF THE INVENTION

An object of the present invention is thus to provide a castor for furniture or the like which mitigates to a great extent the drawbacks of castors known in the prior art, and in particular the above-mentioned drawbacks.

More precisely, the present invention provides a castor for furniture or the like, comprising:
a body;
means for connecting said body to furniture;
a rotary bearing wall defined substantially in a first plane;
means for securing the bearing wall to the body;
at least one wheel including an orifice defined on a first axis;
a rotary shaft of section complementary to the orifice, said rotary shaft defining a second axis; and
means for mounting said rotary shaft in co-operation with said first bearing wall, said rotary shaft also being suitable for being engaged in said orifice in such a manner that the first and second axes coincide to enable the wheel to pivot about the second axis;
wherein the bearing wall is constituted by:
a first bearing wall portion, said first bearing wall portion being generally in the form of a tuning-fork defining a slot between two limbs secured to a slab defining the end of said slot, said two limbs being situated in planes that are substantially parallel to the first plane;
a second bearing wall portion comprising a base and a tenon secured to said base, said tenon being of a shape that its substantially complementary, at least in part, to the slot so as to enable it to be engaged in said slot;
means for uniting said first and second bearing wall portions when the tenon is engaged in the slot;
said means for securing the bearing wall to the body being constituted by means for securing the first wall portion with said body; and
said means for mounting said rotary shaft to co-operate with the bearing wall being constituted by:
at least a first oblong hole made in one of the first and second limbs and centered on a third axis substantially perpendicular to the first plane; and
a third oblong hole made in said tenon;
said first and third oblong holes being of cross-section substantially equal to the section of said rotary shaft and of longitudinal section greater than the section of said shaft, and being arranged respectively in one of said two limbs and in the tenon in such a manner that when the tenon is engaged in the slot, they are both centered on said third axis, the rotary shaft thus being capable of passing right through the bearing wall so that the second axis is substantially parallel to said third axis and can have one of its ends engaged in the orifice of the wheel.

According to another characteristic of the invention, the castor further includes a second oblong hole made in the second limb in a manner that is substantially symmetrical to the first oblong hole about said first plane.

BRIEF DESCRIPTION OF THE DRAWINGS

Other characteristics and advantages of the invention appear from the following description given with reference to the accompanying drawings by way of non-limiting illustration, and in which.

MORE DETAILED DESCRIPTION

Firstly it is specified that in the figures, the same references are used to designate the same elements, regardless of the figure in which they appear, and regardless of the way in which the elements are shown therein. Similarly, if elements are not specifically referenced in one of the figures, their references can easily be found by referring to another figure.

With reference to the three figures numbered 1 to 3, the present invention relates to a castor for furniture or the like.

Figure 3:
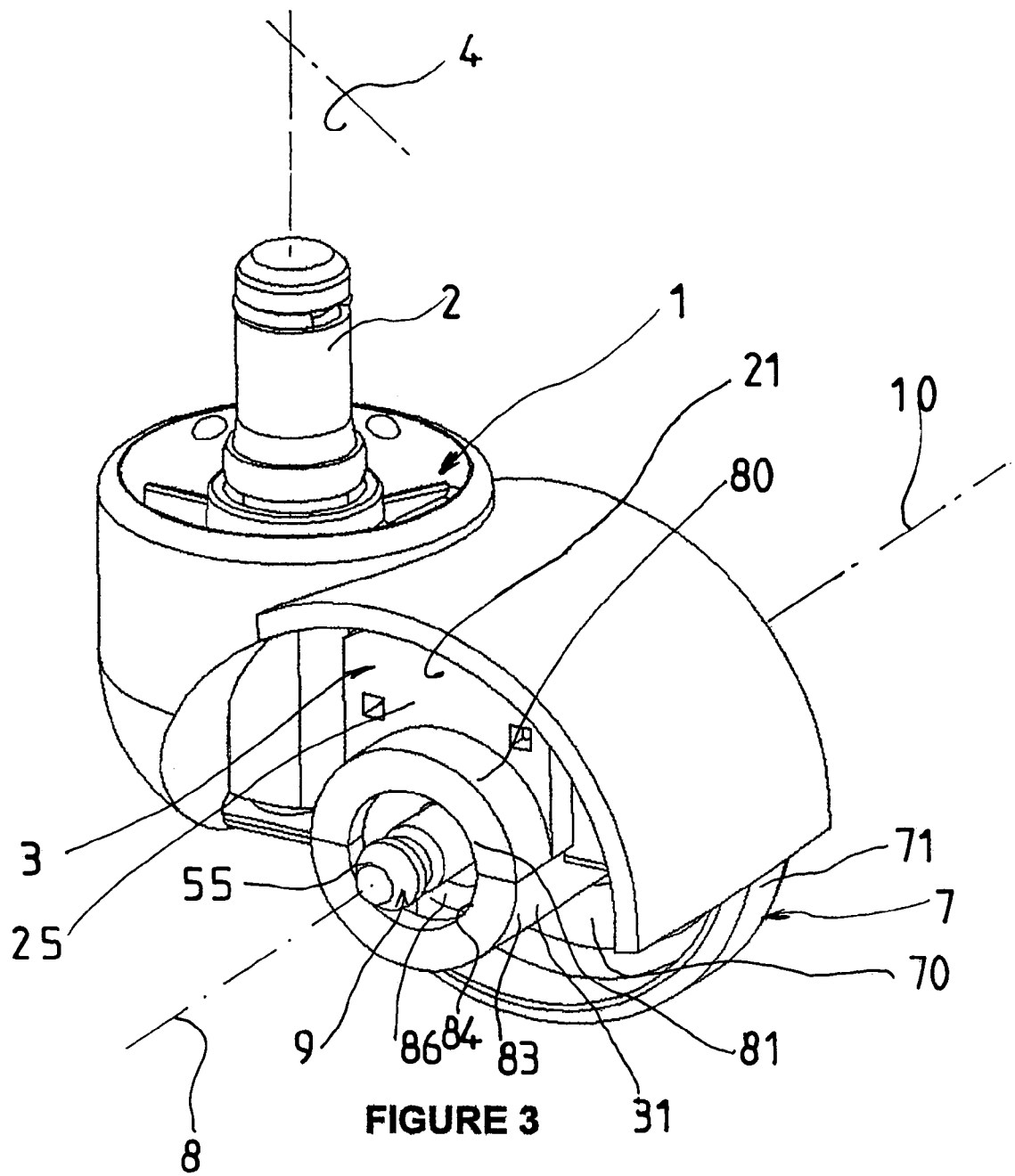
FIG. 3 is a perspective view of the FIG. 2 embodiment of a castor from which one of the wheels has been removed to show more clearly the structure of said castor when its component parts are assembled together.

The castor comprises a body 1 of a shape that is well known in this field, means 2 for connecting the body to a piece of furniture, e.g. a pivot as shown more particularly in FIG. 3, or any other optionally releasable fastening means.

The castor also comprises a wall 3 of a rotary bearing, which wall is defined substantially in a first plane 4 which advantageously contains the axis of the pivot, means 5 for securing the bearing wall 3 to the body 1, and at least one wheel 6, 7, and preferably two wheels as in the embodiment shown in order to obtain better stability in running. In conventional manner, each wheel includes an orifice 12 defined on a first axis 8.

The castor also comprises a rotary shaft 9, generally made of metal or the like, of section that is complementary to the orifice 12, the rotary shaft defining a second axis 10, and means 11 for mounting the rotary shaft 9 in co-operation with the bearing wall 3. The rotary shaft 9 is also adapted to be engaged, preferably by force, in the orifice 12 in each wheel 6, 7 in such a manner that the first and second axes 8 and 10 coincide so as to ensure that the wheel(s) 6, 7 is/are suitable for rotating about the second axis 10.

According to an important characteristic of the invention, the bearing wall 3 is constituted by a first bearing wall portion 21 of generally tuning-fork shape, defining a slot 22 between two limbs 23, 24 secured to a slab 25 defining the end 26 of the slot 22, the two limbs being situated in planes that are substantially parallel to the first plane 4, and by a second bearing wall portion 31 comprising a base 32 and a tenon 33 secured to the base 32, the tenon being substantially in a form that is at least partially complementary to the slot 22 so as to enable it to be engaged in said slot.

The castor also comprises means 40 for connecting together the first and second bearing wall portions 21 and 31 when the tenon 33 is engaged in the slot 22. A preferred embodiment of such means 40 is described below.

The means 5 for securing the bearing wall 3 to the body 1 are constituted by means for securing the first bearing wall portion 21 to the body. In practical industrial embodiments, these means 5 are constituted by the fact that the body 1 and the first wall portion 21 are made as a single piece, e.g. by molding a plastics material, or the like.

In addition, according to a characteristic of the invention, the above-defined means 11 for mounting the rotary shaft 9 in co-operation with the bearing wall 3 are constituted by at least one oblong hole made in a limb of the first bearing wall portion 21, and most advantageously first and second oblong holes 51 and 52 as shown in the figures, formed respectively in each of the two limbs 23 and 24, and a third oblong hole 54 formed in the tenon 33.

The three slots 51, 52, and 54 are of cross-section substantially equal to or very slightly greater than the section of the rotary shaft 9, and a longitudinal section that is greater than the section of said shaft. The length of the longitudinal section of each of these three slots is defined below. In addition, they are arranged respectively in the two limbs 23 and 24 and in the tenon 33 in such a manner as to enable all three of them to be centered on a third axis 53 substantially perpendicular to the first plane 4 when the tenon 33 is engaged in the groove 22, the rotary shaft thus being capable of passing right through the bearing wall 3 so that the second axis 10 is substantially parallel to the third axis 53 and can be engaged via one (55) of its ends 55 and 56 in the orifice 12 of at least one of the two wheels. In the preferred embodiment shown, the rotary shaft has both of its ends engaged in respective orifices 12 of the two wheels 6, 7.

The rotary shaft 9 can thus rotate about its own axis 10 and can move in translation perpendicular to said axis traveling along all that portion of the length of the longitudinal section that is common to the three slots, for the purpose that is specified below.

According to another characteristic of the invention, the castor further comprises means 60 for exerting a resilient thrust force between the first bearing wall portion 21 and the rotary shaft 9. These means 60 advantageously include a fourth hole 61 made in the tenon 33 between the face 68 of the tenon facing towards the end 26 of the notch 22, and the third hole 54, said fourth hole 61 being made along a fourth axis 62 that is substantially perpendicular to the third axis 53, the fourth hole 61 containing a spring 63 shown diagrammatically in FIG. 1 and in perspective in FIG. 2.

The spring 63 is placed in the fourth hole 61 along the fourth axis 62 in such a manner that a first one (64) of its ends 64 and 65 co-operates with the end 26 of the slot 22, and its other or second end 65 co-operates in friction with the portion of the side wall of the rotary shaft 9 that is to be found in the third hole 54.

Preferably, in order to avoid too rapid wear of the second end 65 of the spring, and of the wall of the rotary shaft 9, the second end 65 of the spring 63 co-operates in friction with the portion of the side wall of the rotary shaft 9 by means of a friction shoe 66 slidably mounted in the fourth hole 61 and interposed between said second end and the side wall of the rotary shaft 9.

By way of example, such a shoe may be constituted by an endpiece interposed between the spring 63 and the rotary shaft 9. Nevertheless, and advantageously as shown in section in FIG. 1, it may be constituted by a ring or the like having a central hole of section complementary to that of the rotary shaft, which shaft passes through said ring.

In addition to that above-mentioned advantage, the shoe may possess the advantage of acting as a spreader of lubricant, such as grease or the like, introduced in the slot 22 for the purpose that is explained below when describing how the castor is assembled and how it operates, even though such lubricant need be placed only in the orifices 12 of the wheels 6 and 7.

The decision as to whether or not to use a lubricant and introduce it in one or other of the elements mentioned above comes within the competence of the person skilled in the art.

The above description of a castor refers essentially to a castor having at least one wheel such as the wheel 6. However it is clear that the description applies equally well to a castor having two wheels 6 and 7, as shown. Since the castor is symmetrical about the plane 4, a description of a two-wheel castor is not specifically necessary and can be deduced automatically from the above description.

In conventional manner, and as shown diagrammatically in the figures, a wheel such as the wheel 6 or 7 comprises: a generally disk-shaped web 70 defined substantially in a plane perpendicular to the first axis 8, a tread 71 secured to the outer edge of the wheel web 70, a sleeve 72 having a first one (75) of its ends 75 and 76 secured to the wheel web, the sleeve projecting from the wheel web and being centered on the first axis 8. The orifice 12 is formed at least in the sleeve, and in accordance with the invention, the wheel further comprises a circular collar 73 projecting outwards from the outer side wall 74 of the sleeve 72 substantially at the second end 76 of said sleeve, in a plane perpendicular to the first axis 8.

Under such circumstances, the castor further comprises a first half-sleeve 80 that is substantially circularly cylindrical secured externally via one of its two ends to the side wall of one of the two limbs 23, 24 of the first bearing wall portion 21, the branch having the first oblong hole formed therein, i.e. the hole 51 for the wheel 6 with reference to the embodiment shown in the figures. This first half-sleeve 80 is centered on the third axis 53 and its inside diameter is greater than the outside diameter of the circular collar 73.

The castor also includes a first circular half-collar 81 secured to the other end of the first half-sleeve 80 and projecting from the inside wall 82 of said first half-sleeve in a plane substantially perpendicular to the third axis 53, the diameter of the inside edge of the first circular half-collar 81 being less than the outside diameter of the circular collar 73, but, naturally, greater than the diameter of the sleeve 72.

In addition, and according to a characteristic of the invention, the base 32 is constituted by at least one second substantially circularly cylindrical half-sleeve 83 secured via one of its ends to the tenon 33, said second half-sleeve 83 being centered on the third axis 53 when the tenon 33 is fully engaged in the slot 22, its inside diameter being equal to that of the first half-sleeve 80 and greater than that of the circular collar 73. This second half-sleeve 83 is symmetrical to the first half-sleeve 80 as defined above.

The castor also comprises a second circular half-collar 84 secured to the other end of the second half-sleeve 83, projecting from the inside wall 85 of said second half-sleeve in a plane substantially perpendicular to the third axis 53, the diameter of the inside edge of the second circular half-collar 84 being less than the outside diameter of the circular collar 73, but naturally, likewise greater than the diameter of the sleeve 72.

Figure 1:
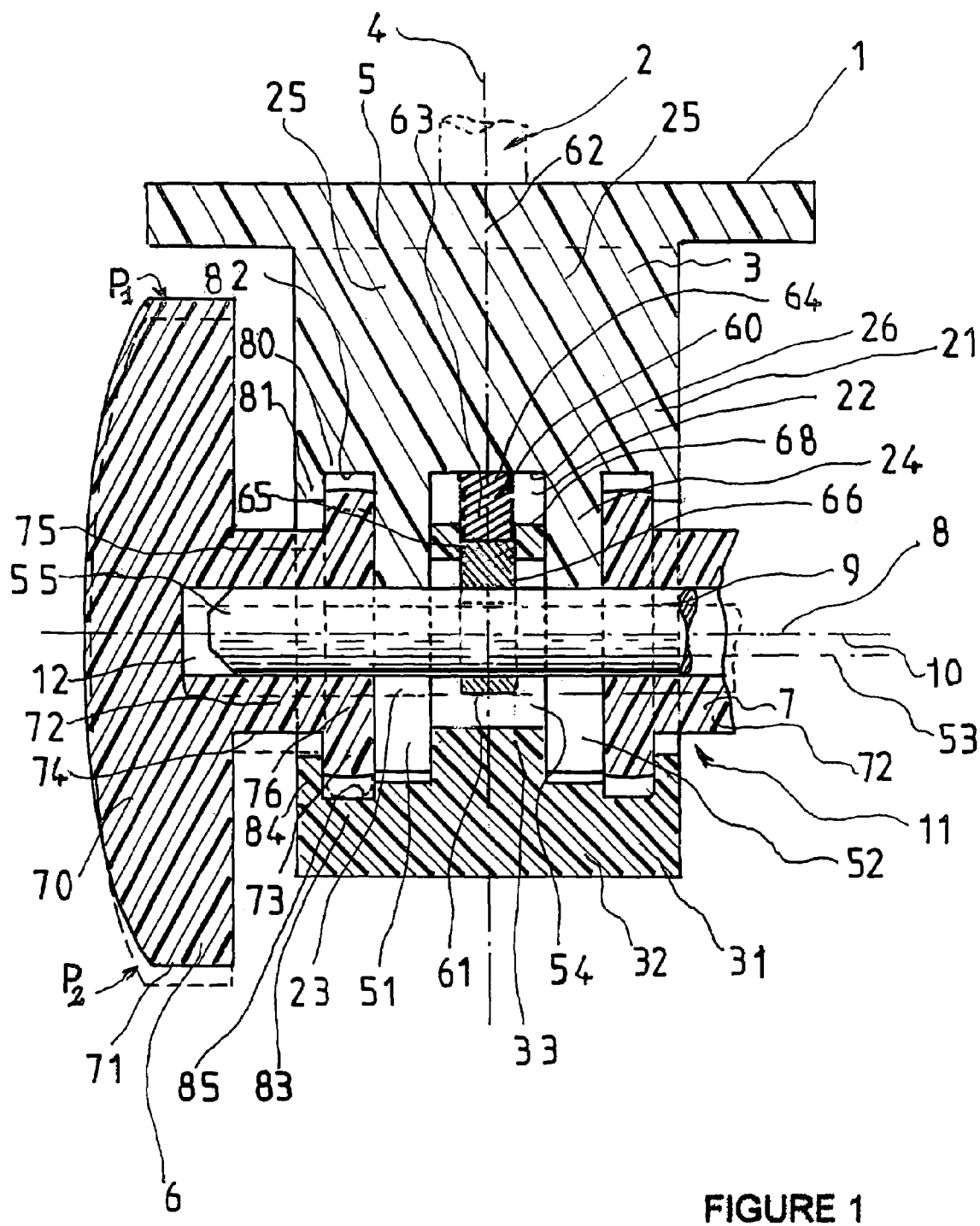
FIG. 1 is a diagrammatic section view of an embodiment of a portion of a castor of the invention showing clearly the essential characteristics of the invention, the castor being shown in its maximally-loaded state.

In this way, when the rotary shaft 9 is engaged in the orifice 12 and the tenon 33 is engaged fully and securely in the slot 22, the circular collar 73 is contained entirely in the cylindrical housing 86 that is formed and defined by the two circular half-collars 81, 84 in contact with each other via their free ends, as shown in FIGS. 1 and 3, by the outer side wall of the limb 23, 24 carrying the first half-sleeve 80, and by the two inside walls 82, 85 of the first and second half-collars 80 and 83, respectively.

Preferably, the lengths of the longitudinal sections of the first, second, and third oblong holes 51, 52, and 54 are determined in such a manner that when the tenon 33 is engaged in the slot 22 and a load greater than the resilient thrust force given by the spring 63 is applied to the body 1, then the rotary shaft 9 comes into abutment against the ends of the first and second holes 51 and 52 that are situated closest to the slab 25 (position $P_1$ as shown in continuous lines in FIG. 1), and when the tenon 33 is engaged in the slot 22 and a load smaller than that of the resilient thrust force given by the spring 63 is applied to the body 1, then the circular collar 73 comes to rub against the inside wall 85 of the second half-sleeve 83 (position $P_2$ in dashed lines in FIG. 1).

Figure 2:
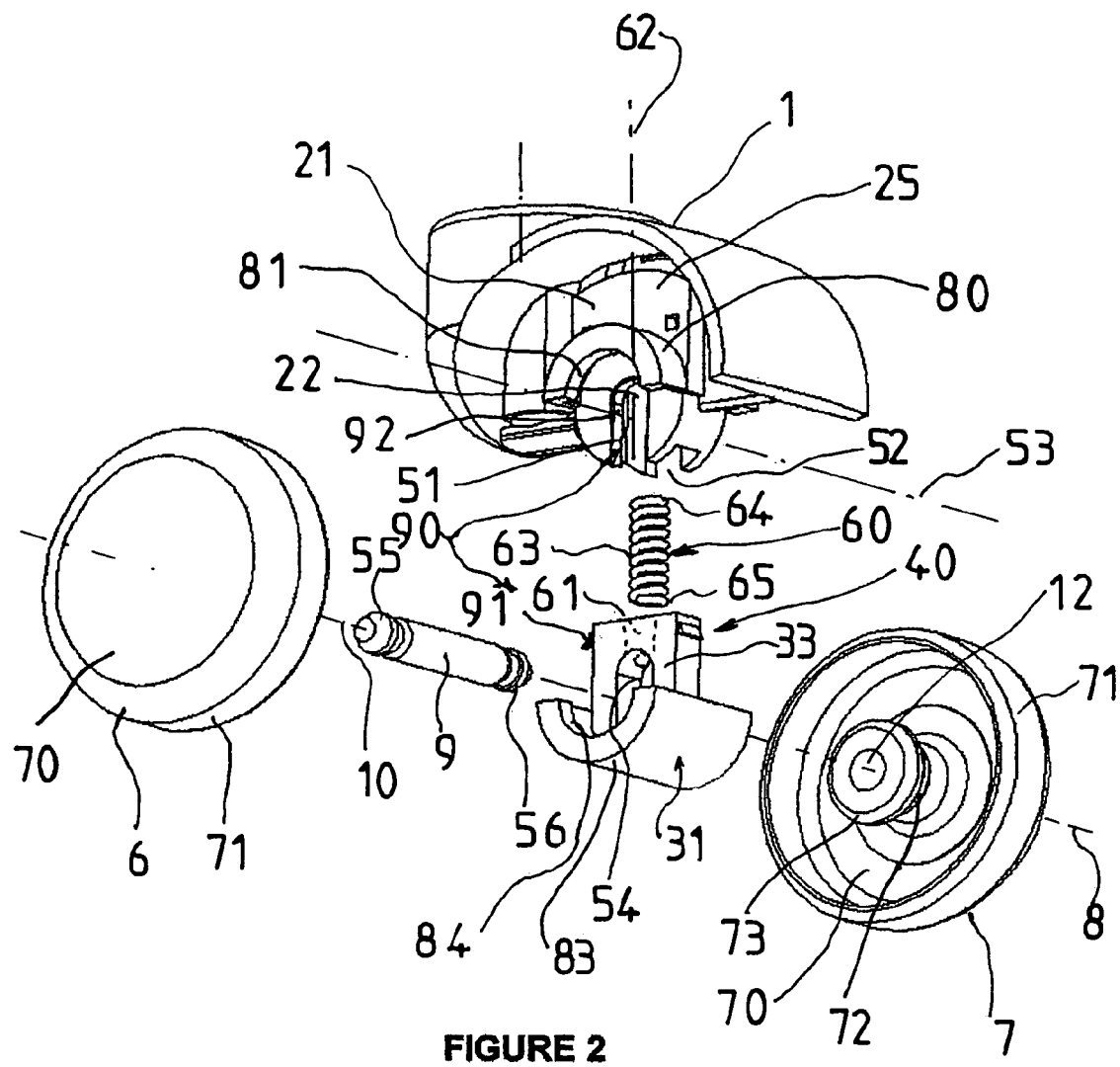
FIG. 2 is an exploded perspective view in which the component parts are not assembled together, showing a preferred embodiment of the castor of the invention.

In addition, to make assembly of the castor of the invention even easier, it is most preferable for the first and second holes 51 and 52 made respectively in the two limbs 23 and 24 to be constituted by holes that are open, as can be seen more clearly in FIG. 2, opening out respectively in the ends of the limbs that are furthest from the slab 25.

Finally, as mentioned above, the castor has means 5 for uniting the first and second bearing wall portions 21 and 31 when the tenon 33 is engaged in the slot 22. Like the means shown in FIG. 2, these means 5 are advantageously constituted by at least one interfitting engagement 90 comprising a male bead 91 formed on one of the two elements comprising the tenon 33 and the wall of the slot 22, and a hollow catch 92 of shape that is substantially complementary to that of the bead 91, the catch 92 being made in the other one of these two elements.

In the embodiment shown of the castor of the invention, which is the preferred embodiment, the catch (or catches) 92 is in the slot 22, while the bead (or beads) 91 projects from the tenon 33.

The castor is assembled and operates as describes below.

It is assumed that the components of the castor are initially separate from one another as shown in FIG. 2.

Starting from this state, the rotary shaft 9 is initially put into place in the third oblong hole 54 so as to project from opposite sides of the tenon 33.

The two wheels 6 and 7 are then engaged by force on respective ones of the two ends 55 and 56 of the rotary shaft 9 so that, by virtue of the length of the longitudinal section of the third hole 54, the circular collar 73 of each wheel is placed between the circular half-collar 84 and the tenon 33 of the second bearing wall portion 31.

Thereafter, the spring 63 is inserted into the fourth hole 61 with or without the shoe 66, but advantageously with a shoe, depending on the selected configuration that is to be imparted to the castor.

This first subassembly of parts as built up in this way is presented to co-operate with the second subassembly which is advantageously constituted by a single piece, and comprises the body 1 and the first bearing wall portion 21, so that the tenon 33 is presented to the slot 22.

These two subassemblies are then associated with each other by causing the tenon 33 to penetrate into the slot 22 while compressing the spring 63. Lubricant, such as grease or the like, may optionally be included in the slot and/or in the third hole 54.

The tenon is pushed into the slot 22 until the two beads 91 are received in respective ones of the two catches 92. In this movement, by virtue of the structure of the above-described parts, the two circular half-collars 81 and 84 meet via their free ends so as to form the housing 86 in which the circular collar 73 is enclosed.

Once the tenon 33 and the slot 72 have reached their respective final positions, assembly of the castor is fully terminated.

Such a castor may naturally be mounted in conventional manner to a piece of furniture, e.g. a chair or the like, by means of the pivot 2.

The structural parameters of the spring 63 are defined in such a manner that when nobody is sitting in the chair, the force exerted by the spring is strong enough to push the rotary shaft 9 away from the slab 25. The circular collar 73 then rubs against the inside wall 85 of the second half-sleeve 83, as shown by dashed lines at $P_2$ in FIG. 1. As a result, if the chair is subjected to an involuntary or other impact, the friction between the circular collar 73 and the wall 85 prevents the wheel (or both wheels 6, 7) from turning about the axis 10. The castor is strongly braked, and the chair cannot move far. The circular collar 73 and the wall 85 thus act as a brake, e.g. preventing the chair from striking an object which it might damage, or from behaving as a dangerous obstacle.

In contrast, when a person of normal weight is sitting on the chair provided with castors of the invention, the spring 63 is depressed so that the rotary shaft 9 comes into abutment against the ends of the first and second holes 51 and 52 that are situated closest to the slab 25 of the castor. In this situation, which is shown in continuous lines $P_1$ in FIG. 1, the ends of these two holes constitute the rotary bearing for the rotary shaft 9, and while remaining seated, the person can act on the chair to move it at will, the wheels 6 and 7 being capable of pivoting on the bearing ends, which may optionally be lubricated.

As mentioned above, rotation of the shaft 9 may be encouraged by a lubricant such as grease or the like that is initially placed in the slot 22 and/or the third hole 54 and/or the wheel orifice 12 and/or the wall of the rotary shaft 9, and optionally spread over the wall of the shaft, in particular by means of the shoe 66.

Another advantage of the castor of the invention should also be emphasized: any grease which may accidentally be in excess in the slot 22, and which will thus be expelled via the two holes 51 and 52 can under no circumstances drip onto the floor, since it remains held captive in the bottom of the above-defined housing 86. Even if the presence of lubricant in the bottom of this housing 86 is quite harmful to the above-defined braking function, no marks will be left on the floor, e.g. in offices such a floor is generally covered by carpet or the like.

What is claimed is:

1. A castor for furniture or the like, the castor comprising:
   a body;
   means for connecting said body to furniture;
   a rotary bearing wall defined substantially in a first plane;
   means for securing the bearing wall to the body;
   at least one wheel including an orifice defined on a first axis;
   a rotary shaft of section complementary to the orifice, said rotary shaft defining a second axis; and
   means for mounting said rotary shaft in co-operation with said first bearing wall, said rotary shaft also being suitable for being engaged in said orifice in such a manner that the first and second axes coincide to enable the wheel to pivot about the second axis;
   wherein the bearing wall is constituted by:
   a first bearing wall portion, said first bearing wall portion being generally in the form of a tuning-fork defining a slot between two limbs secured to a slab defining the end of said slot, said two limbs being situated in planes that are substantially parallel to the first plane;
   a second bearing wall portion comprising a base and a tenon secured to said base, said tenon being of a shape that its substantially complementary, at least in part, to the slot so as to enable it to be engaged in said slot;
   means for uniting said first and second bearing wall portions when the tenon is engaged in the slot;
   said means for securing the bearing wall to the body being constituted by means for securing the first wall portion with said body; and
   said means for mounting said rotary shaft to co-operate with the bearing wall being constituted by:
   a first oblong hole made in the first limb and a second oblong hole in the second limb; and
   a third oblong hole made in said tenon;
   said first, second and third oblong holes being of cross-section substantially equal to the corresponding cross-section of said rotary shaft and of longitudinal section greater than the corresponding longitudinal section of said shaft, and being arranged respectively in the limbs and in the tenon in such a manner that when the tenon is engaged in the slot, they are centered on a third axis substantially perpendicular to the first plane, the rotary shaft thus being capable of passing right through the bearing wall so that the second axis is substantially parallel to the third axis and can have one of its ends engaged in the orifice of the wheel.

2. A castor according to claim 1, wherein the second oblong hole is substantially symmetrical to the first oblong hole about said first plane.

3. A castor according to claim 2, wherein the first and second holes formed respectively in the two limbs are constituted by open holes opening out respectively in the ends of the limbs that are furthest from the slab.

4. A castor according to claim 1, including means for exerting a resilient thrust force between the first bearing wall portion and the rotary shaft.

5. A castor according to claim 4, wherein the means for exerting a first resilient force between the first bearing wall portion and the rotary shaft comprise:
   a fourth hole formed in the tenon between the face of the tenon facing towards the end of the slot and the third hole, said fourth hole extending along a fourth axis that is substantially perpendicular to the third axis; and
   a spring disposed in the fourth hole, a first of the ends of the spring co-operating with the end of the slot, and the second end of the spring co-operating in friction with the portion of the side wall of the rotary shaft that lies in the third hole and on the fourth axis.

6. A castor according to claim 5, wherein the second end of the spring co-operates in friction with the portion of the side wall of the rotary shaft that is located in the third hole by means of a friction shoe mounted to slide in the fourth hole and interposed between said second end of the spring and the material of the side wall of the rotary shaft that is located in the third hole.

7. A castor according to claim 6, wherein said shoe is constituted by at least one of the following elements: an endpiece; and a ring having a central hole of section complementary to the section of the rotary shaft, which shaft passes through the ring.

8. A castor according to claim 1, wherein the wheel comprises a wheel web of generally disk shape substantially defined in a plane perpendicular to the first axis, a tread secured to the outer edge of said wheel web, a sleeve having a first one of its ends secured to said wheel web, said sleeve projecting from said wheel web and being centered on the first axis, said orifice being formed at least in said sleeve, and a circular collar projecting from the outside wall of said sleeve substantially at the second end of said sleeve, in a plane that is substantially perpendicular to the first axis.

9. A castor according to claim 8, further comprising a first substantially circularly cylindrical half-sleeve secured on the outside via one of its two ends to the side wall of one of the two limbs of the first bearing wall portion, said first half-sleeve being centered on the third axis and its inside diameter being greater than the outside diameter of the circular collar, and a first circular half-collar secured to the other end of the first half-sleeve and projecting from the inside wall of said first half-sleeve in a plane substantially perpendicular to the third axis, the diameter of the inside edge of the first circular half-collar being less than the outside diameter of the circular collar, and by the fact that said base is constituted by at least one second substantially circular cylindrical half-sleeve secured to said tenon via one of its ends, said second half-sleeve being centered on the third axis when the tenon is engaged in the slot, its inside diameter being equal to the diameter of the first half-sleeve and greater than the diameter of the circular collar, a second circular half-collar secured to the other end of the second half-sleeve and projecting from the inside wall of said second halfsleeve in a plane that is substantially perpendicular to the third axis, the diameter of the inside edge of the second circular half-collar being less than the outside diameter of the circular collar, in such a manner that when the rotary shaft is engaged in the orifice and the tenon is engaged fully and securely in the slot, said circular collar is situated in the cylindrical housing formed and defined by the two circular half-collars contacting each other via their free ends, with the outside wall of the limb carrying the first halfsleeve and the two inside walls respectively of the first and second half-sleeves.

10. A castor according to claim 9, wherein the second oblong hole is substantially symmetrical to the first oblong hole about said first plane, and wherein the lengths of the longitudinal sections of the first, second, and third oblong holes are determined in such a manner that when a load greater than the resilient thrust force is applied to said body, the rotary shaft comes into abutment against the ends of the first and second holes situated closest to the slab, and when a load less than that of the resilient thrust force is applied to said body, the circular collar comes into abutment against the inside wall of the second half-sleeve.

11. A castor according to claim 1, wherein the means for uniting the first and second bearing wall portions when the tenon is engaged in the slot are constituted by at least one engagement between a male bead formed on one of the two elements comprising the tenon and the wall of the slot, and by a recessed catch of shape substantially complementary to the shape of said bead, said catch being made in the other one of said two elements.

* * * * *